(12) United States Patent
Shi et al.

(10) Patent No.: US 12,301,094 B2
(45) Date of Patent: May 13, 2025

(54) MODULATION TO EXTEND DUAL-ACTIVE BRIDGE CONVERTER ZERO-VOLTAGE SWITCHING MARGIN UNDER PARAMETER VARIATION

(71) Applicant: Rivian IP Holdings, LLC, Plymouth, MI (US)

(72) Inventors: Yanjun Shi, Torrance, CA (US); Zahra Mohajerani, Los Angeles, CA (US); Mohammad Nanda Rahmana Marwali, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 357 days.

(21) Appl. No.: 18/075,112

(22) Filed: Dec. 5, 2022

(65) Prior Publication Data

US 2024/0186883 A1 Jun. 6, 2024

(51) Int. Cl.
*H02M 3/335* (2006.01)
*H02M 1/00* (2006.01)

(52) U.S. Cl.
CPC ..... *H02M 1/0058* (2021.05); *H02M 3/33584* (2013.01)

(58) Field of Classification Search
CPC ............. H02M 1/0054; H02M 1/0058; H02M 3/33584; H02M 3/335; H02M 3/3353
See application file for complete search history.

(56) References Cited

U.S. PATENT DOCUMENTS

| | | | |
|---|---|---|---|
| 10,122,367 B1* | 11/2018 | Albertini | H02M 3/33584 |
| 2022/0014106 A1* | 1/2022 | Askarianabayaneh | H02M 1/40 |
| 2023/0198393 A1* | 6/2023 | Mohajerani | B60L 53/31 |
| | | | 323/282 |
| 2024/0154534 A1* | 5/2024 | Shi | H02M 3/33584 |

OTHER PUBLICATIONS

Krismer, et al., "Closed form solution for minimum conduction loss modulation of DAB converters," IEEE Transactions on Power Electronics 27.1 (2011): 174-188.

* cited by examiner

*Primary Examiner* — Adolf D Berhane
(74) *Attorney, Agent, or Firm* — Haley Guiliano LLP (57) ABSTRACT

Systems and methods for controlling a dual active bridge converter are disclosed herein. A probability of losing zero voltage switching (ZVS) of a dual active bridge (DAB) converter comprising is determined. At least one control variable of a plurality of control variables of the DAB converter is modified to change ZVS margin to achieve ZVS based on a determined probability of losing ZVS. A plurality of switch control signals, which are provided to respective switches of the primary bridge and the secondary bridge of the DAB, are caused to switch according to a time-based switching sequence based on the plurality of control variables.

20 Claims, 7 Drawing Sheets

MODULATION TO EXTEND DUAL-ACTIVE BRIDGE CONVERTER ZERO-VOLTAGE SWITCHING MARGIN UNDER PARAMETER VARIATION

INTRODUCTION

The present disclosure relates to dual active bridge (DAB) converters and, more particularly, to systems and related processes for controlling a DAB converter in a manner that extends zero-voltage switching (ZVS) margin and reduces switching losses in the DAB converter under parameter variation.

SUMMARY

Dual active bridge converters are utilized to provide direct current-to-direct current (DC-DC) conversion for a multitude of applications. One such application is an electric vehicle charging station, in which a dual active bridge converter receives a DC voltage derived from an AC power grid, converts the received DC voltage to another DC voltage, and provides the converted DC voltage to a charging port of an electric vehicle. Another such application is in an electric vehicle, in which a DAB converter receives a DC voltage derived from the vehicle battery, converts the received DC voltage to another DC voltage, and provides the converted DC voltage at an output port of an electric vehicle or to power systems of the electric vehicle. In one approach, a triple phase shift (TPS) modulation scheme is used to operate the DAB converter during light load conditions. A TPS modulation scheme may involve controlling the duty ratios of the primary side switches and the secondary side switches and the phase shift between the primary and secondary side to try and achieve ZVS. In one approach, one or more control variables of the TPS modulation scheme may be calculated offline (e.g., before operation of the DAB converter). However, in this approach, the DAB converter may not achieve ZVS under a wide range of operating conditions (e.g., due to inaccuracies of the model used to determine the one or more control variables, gate jitter, transformer current bias, unsymmetric switching delay, variation in parts of the DAB converter, a deviation between expected and actual results, etc.), unless a large ZVS margin for all conditions operating conditions is provided. However, providing a large ZVS margin may require a large look-up table and may increase the conduction loss of the DAB converter.

In another approach, one or more control variables of the TPS modulation scheme may be calculated online (e.g., during operation of the DAB converter). However, in this approach, the DAB converter may not achieve ZVS under a wide range of operating conditions (e.g., due to inaccuracies of the model used to determine the one or more control variables, noise in feedback signals, variation in parts of the DAB converter, a deviation between expected and actual results, etc.)

For improved efficiency, the present disclosure provides systems and methods for controlling a DAB converter (e.g., a DC-DC converter) to increase efficiency by extending ZVS, while reducing switching losses in the DAB converter under parameter variation. For example, the present disclosure modifies at least one control variable of a plurality of predetermined control variables of the DAB converter (e.g., at least one of the duty ratios of the primary side switches and the secondary side switches) to change ZVS margin to achieve ZVS based on a determined probability of losing ZVS. By operating the DAB converter under these conditions, switching losses, temperature rise, electromagnetic interference (EMI), and failure rate may be reduced.

A method for operating a DAB converter including a primary bridge, a secondary bridge, and a transformer coupling the primary bridge to the secondary bridge, is provided. The method includes determining a probability of losing ZVS of the DAB converter, modifying at least one control variable of a plurality of control variables of the DAB converter to change ZVS margin to achieve ZVS based on a determined probability of ZVS, and causing a plurality of switch control signals, which are provided to respective switches of the primary bridge and the secondary bridge, to switch according to a time-based switching sequence based on the plurality of control variables.

In some embodiments, determining the probability of losing ZVS may include measuring a temperature of the DAB converter, and determining the probability of losing ZVS based on the measured temperature.

In some embodiments, determining the probability of losing ZVS may further include determining whether the DAB converter is operating under partial ZVS, determining a difference between a predetermined phase shift between the primary bridge and the secondary bridge and a real-time phase shift between the primary bridge and the secondary bridge, and determining the probability of losing ZVS based on the determination of whether the DAB converter is operating under partial ZVS, the determination of the difference between the predetermined phase shift and the real-time phase shift, and the measured temperature.

In some embodiments, the probability of losing ZVS based on measured temperature corresponds to a determined temperature rise, where the determined temperature rise is $$\Delta T_{rise} = \left| \frac{\delta(T_{pri} - T_{sec})}{\delta P_{out}} \right|,$$

wherein $T_{pri}$ is a temperature of the primary bridge, $T_{sec}$ is a temperature of the secondary bridge, and $P_{out}$ is a power output of the DAB converter.

In some embodiment, modifying at least one control variable of the plurality of control variables of the DAB converter to change ZVS margin to achieve ZVS comprises iteratively modifying the at least one control variable until the measured temperature reaches a minimum temperature corresponding to a desired ZVS margin.

In some embodiments, the desired ZVS margin may include a minimum current value of the transformer sufficient to enable an anti-parallel diode of each of the respective switches of the primary bridge and the secondary bridge to switch on and discharge charge stored on the respective switch.

In some embodiments, the minimum temperature may correspond to ZVS with an optimal ZVS margin.

In some embodiments, the plurality of control variables of the DAB converter may include a first duty ratio of the primary bridge, a second duty ratio of the secondary bridge, and a phase shift between the primary bridge and the secondary bridge, and modifying at least one control variable may include modifying at least one of the first duty ratio and the second duty ratio.

In some embodiments, modifying at least one of the first duty ratio and the second duty ratio may include adjusting at least one of a differential mode (DM) adjustment variable and a common mode (CM) adjustment variable.

In some embodiments, determining the probability of losing ZVS may include measuring a current of the transformer, and determining the probability of losing ZVS based on the measured current of the transformer.

A system for controlling a DAB converter having a primary bridge, a secondary bridge, and a transformer coupling the primary bridge to the secondary bridge is provided. The system includes a plurality of output ports coupled to switches of the DAB converter and control circuitry coupled to the plurality of output ports. The control circuitry is configured to determine a probability of losing ZVS of the DAB, modify at least one control variable of a plurality of control variables of the DAB converter to change ZVS margin to achieve ZVS based on a determined probability of ZVS, and cause a plurality of switch control signals, which are provided to respective switches of the primary bridge and the secondary bridge, to switch according to a time-based switching sequence based on the plurality of control variables.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
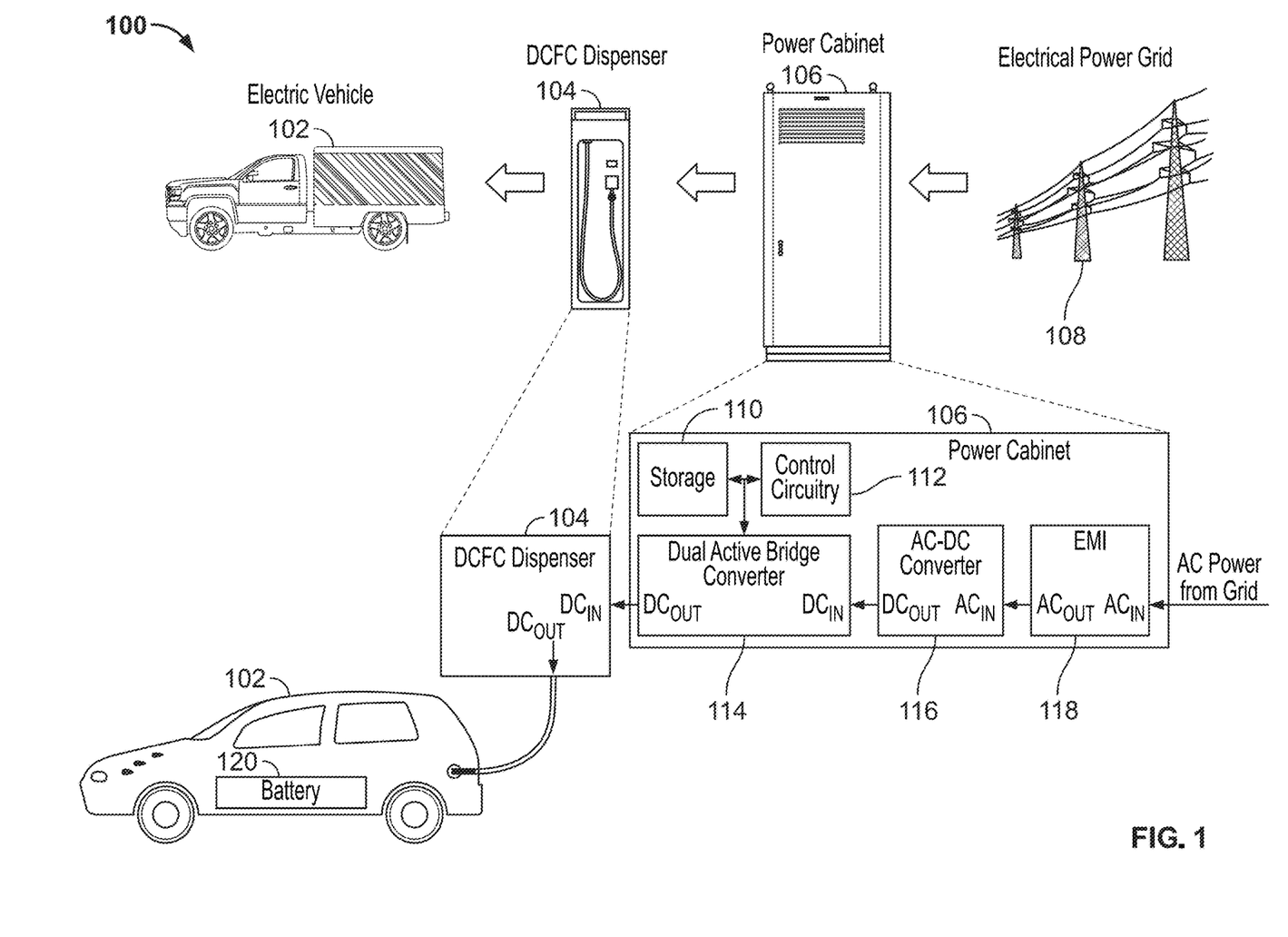
FIG. 1 shows an illustrative block diagram of an electric vehicle charging system including a DAB converter, in accordance with some embodiments of the disclosure.

FIG. 1 shows an illustrative block diagram of an electric vehicle charging system 100 including a DAB converter, in accordance with some embodiments of the disclosure. System 100 includes electric vehicle 102, direct current fast charger (DCFC) dispenser 104, power cabinet 106, and electrical power grid 108. Electric vehicle 102 includes rechargeable battery 120. Power cabinet 106 includes storage 110, control circuitry 112, dual active bridge (DAB) converter 114, AC-DC converter 116, and electromagnetic interference filter (EMI) 118. Power cabinet 106 is coupled to electrical power grid 108 via one or more wired electrical power signal paths, by which electrical power grid 108 provides alternating current (AC) electrical power, such as in the form of a three-phase 480 volt (V) 60 hertz (Hz) signal, to power cabinet 106. EMI 118 performs filtering upon the AC electrical power received from electrical power grid 108 to mitigate high-frequency electromagnetic noise, and outputs a filtered AC power signal to AC-DC converter 116. AC-DC converter 116 converts the filtered AC power signal received from EMI 118 into a DC signal, such as a signal fixed at a voltage in a range from 200 to 920 V and a maximum current of 500 amps (A) at a maximum power of 300 kilowatts (kW). However, this is only one example, an AC-DC converter 116 may provide any suitable voltage and current range. AC-DC converter 116 provides the DC signal to DAB converter 114, which converts the received DC signal into an output DC signal that is provided, by way of DCFC dispenser 104, to charge battery 120 via a charging port of electric vehicle 102. As described in further detail below, control circuitry 112, which is electrically coupled to storage 110 and DAB converter 114, is configured to control DAB converter 114 to transfer power to battery 120 in an efficient manner by modifying duty ratios of DAB converter 114 to change ZVS margin to achieve ZVS based on a determined probability of ZVS, as described in further detail below.

Figure 2:
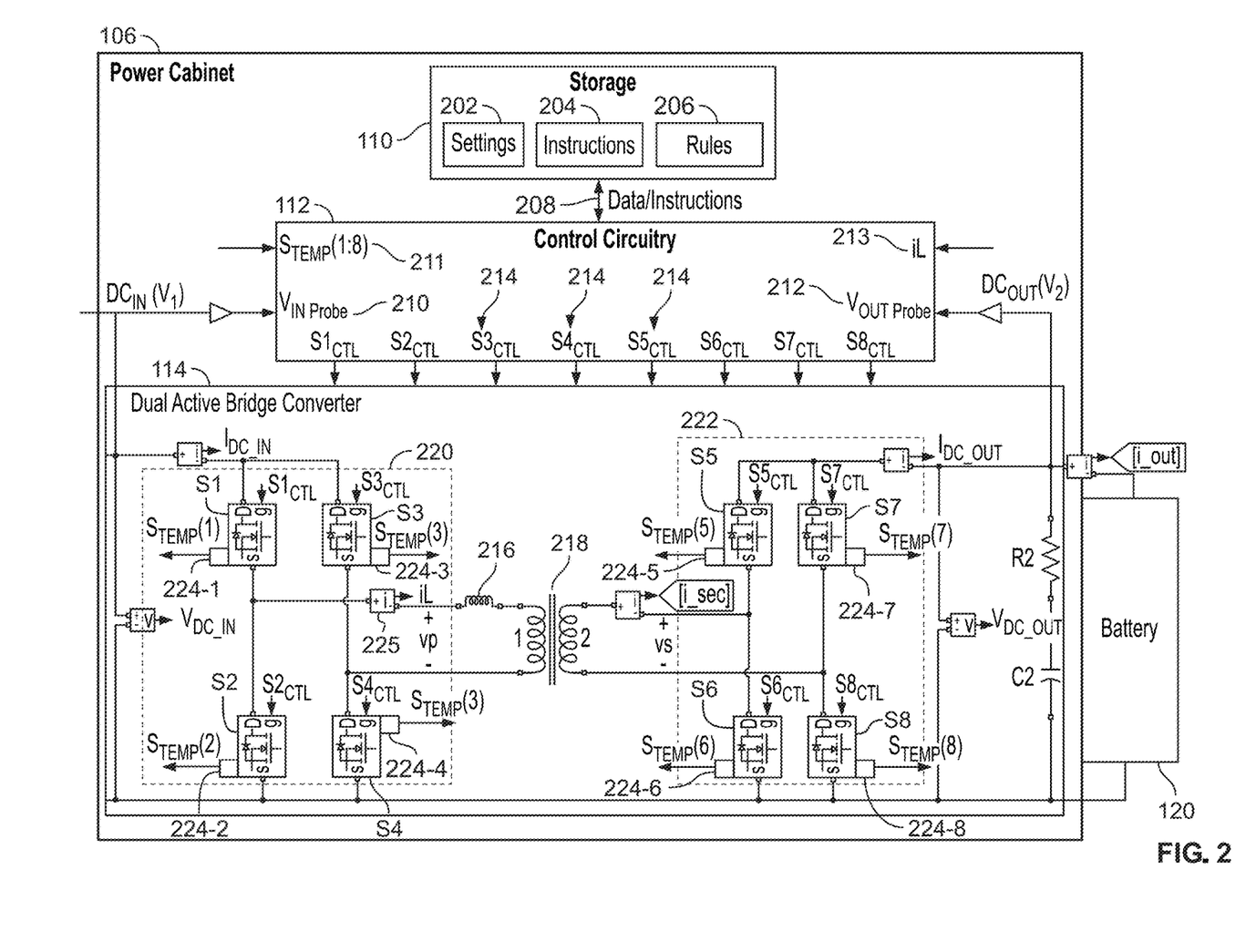
FIG. 2 is an illustrative block diagram showing additional details of some components of a power cabinet, in accordance with some embodiments of the disclosure.

FIG. 2 is an illustrative block diagram showing additional details of some components of power cabinet 106, in accordance with some embodiments of the disclosure. Storage 110 may be an electronic storage device. As referred to herein, the phrase "electronic storage device" or "storage device" should be understood to mean any device for storing electronic data, computer software, or firmware, such as random-access memory, read-only memory, solid state devices, or any other suitable fixed or removable storage devices, and/or any combination of the same. Storage 110 may be used to store various types of instructions, rules, and/or other types of data. In some embodiments, control circuitry 112 executes instructions for an application stored in storage 110 (e.g., to implement one or more of a plurality of modules). Specifically, control circuitry 112 may be instructed by the application to perform the functions discussed herein. In some implementations, any action performed by control circuitry 112 may be based on instructions received from the application. For example, the application may be implemented as software or a set of executable instructions that may be stored in storage 110 and executed by control circuitry 112.

Storage 110, in some aspects, stores settings 202, instructions 204, and rules 206. Example types of settings 202 may include ZVS margin settings, deadtime settings, and/or other types of settings. Example types of rules 206 include computational constants (e.g., values of inductors and/or transformers of DAB converter 114), look-up-tables that define switching sequences, DAB models, ZVS margin adjustment limits, thresholds for determining the probability of losing ZVS, and/or other types of information or data. In some aspects, instructions 204 are executed by control circuitry 112 to implement steps of various methods described herein.

DAB converter 114 includes transformer 218, primary side bridge 220, and secondary side bridge 222. Primary side bridge 220 is coupled to a primary side of transformer 218 via series inductor 216. Secondary side bridge 222 is coupled to a secondary side of transformer 218. As used herein, the "primary side" or "primary bridge" of DAB converter 114 refers to the portion of DAB converter 114 appearing to the left of transformer 218 in FIG. 2, and the "secondary side" or "secondary bridge" of DAB converter 114 refers to the portion of DAB converter 114 appearing to the right of transformer 218 in FIG. 2. As used herein, Vp and Vs refer to the voltage on the primary side of transformer 218 and the voltage on the secondary side of transformer 218, respectively. DAB converter 114 also includes primary side switches S1, S2, S3, and S4 located on the primary side of DAB converter 114 and secondary side switches S5, S6, S7, and S8 located on the secondary side of DAB converter 114. Switches S1, S2, S3, S4, S5, S6, S7, and S8 may be any suitable type of electronic switch, such as a field effect transistor (FET)-based switch, that can be enabled (e.g., switched on/closed, during which current is permitted to be conducted between its source and drain terminal) or disabled (e.g., off/open, during which current is effectively prevented from being conducted between its source and drain terminal) by changing a logic level of the control signal provided to its gate terminal, for example from a logic-high to a logic-low. In some embodiments, switches S1-S8 may be wide bandgap (WBG) based power semiconductors, such gallium nitride (GaN) or silicon carbide (SiC) based semiconductors. In some embodiments, switches S1-S8 may comprise other types of metal-oxide semiconductor field-effect transistors (MOSFETs). As shown, each of the switches S1-S8 includes an anti-parallel diode. Additionally, as understood by those skilled in the art, each of the switches S1-D8 includes an output capacitance (e.g., dependent on the operating voltage of the switch).

Figure 6:
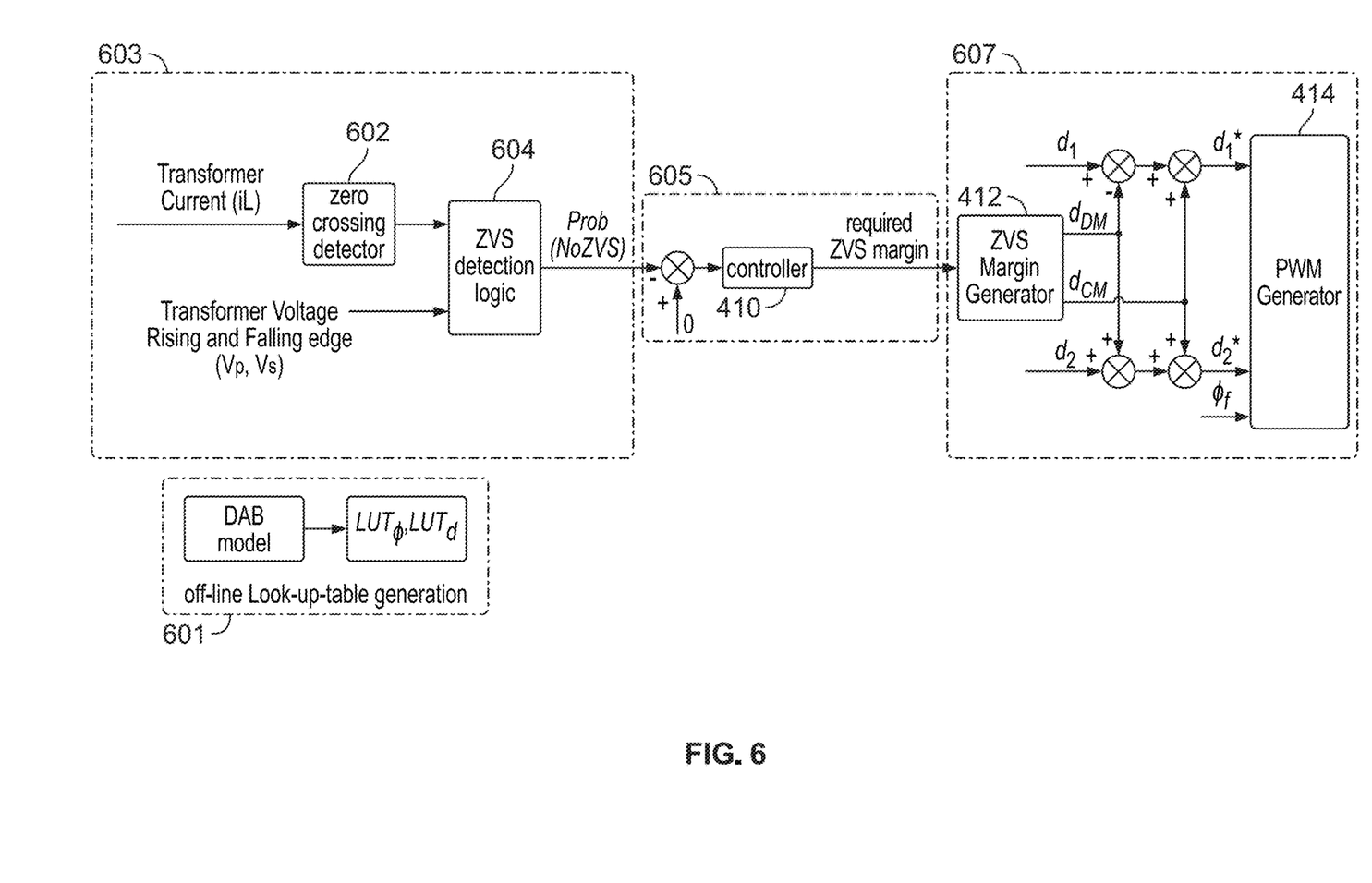
FIG. 6 is an illustrative block diagram of control circuitry and operations for implementing a control process for the DAB converter based on a measured current of the DAB converter, in accordance with some embodiments of the present disclosure.

In some embodiments, temperature sensors 224-1, 224-2, 224-3, 224-4, 224-5, 224-6, 224-7, and 224-8 (collectively referred to as temperature sensors 224), are coupled to, and configured to measure the temperatures of, switches S1, S2, S3, S4, S5, S6, S7, and S8, respectively. Temperature sensors 224-1, 224-2, 224-3, 224-4, 224-5, 224-6, 224-7, and 224-8, output to control circuitry 112 signals ($S_{TEMP}(1)$ through $S_{TEMP}(8)$, collectively, $S_{TEMP}(1:8)$) indicating sensed temperatures of switches S1 through S8, respectively. Complete signal paths from output ports $S_{TEMP}(1)$ through $S_{TEMP}(8)$ of temperature sensors 224-1, 224-2, 224-3, 224-4, 224-5, 224-6, 224-7, and 224-8 to temperature input port 211 ($S_{TEMP}(1:8)$) of control circuitry 112 are omitted from FIG. 2 for clarity. Nonetheless, output ports $S_{TEMP}(1)$ through $S_{TEMP}(8)$ of temperature sensors 224-1, 224-2, 224-3, 224-4, 224-5, 224-6, 224-7, and 224-8 are indeed coupled to temperature input port 211 ($S_{TEMP}(1:8)$) of control circuitry 112 via a signal bus or other suitable respective signal paths. In some embodiments, one or more of temperature sensors 224 may be omitted. For example, in some embodiments, only a single temperature sensor may be provided for each leg or for each side of DAB converter 114. In some embodiments (e.g., as illustrated in FIG. 6), temperature sensors 224 may be omitted.

Figure 4:
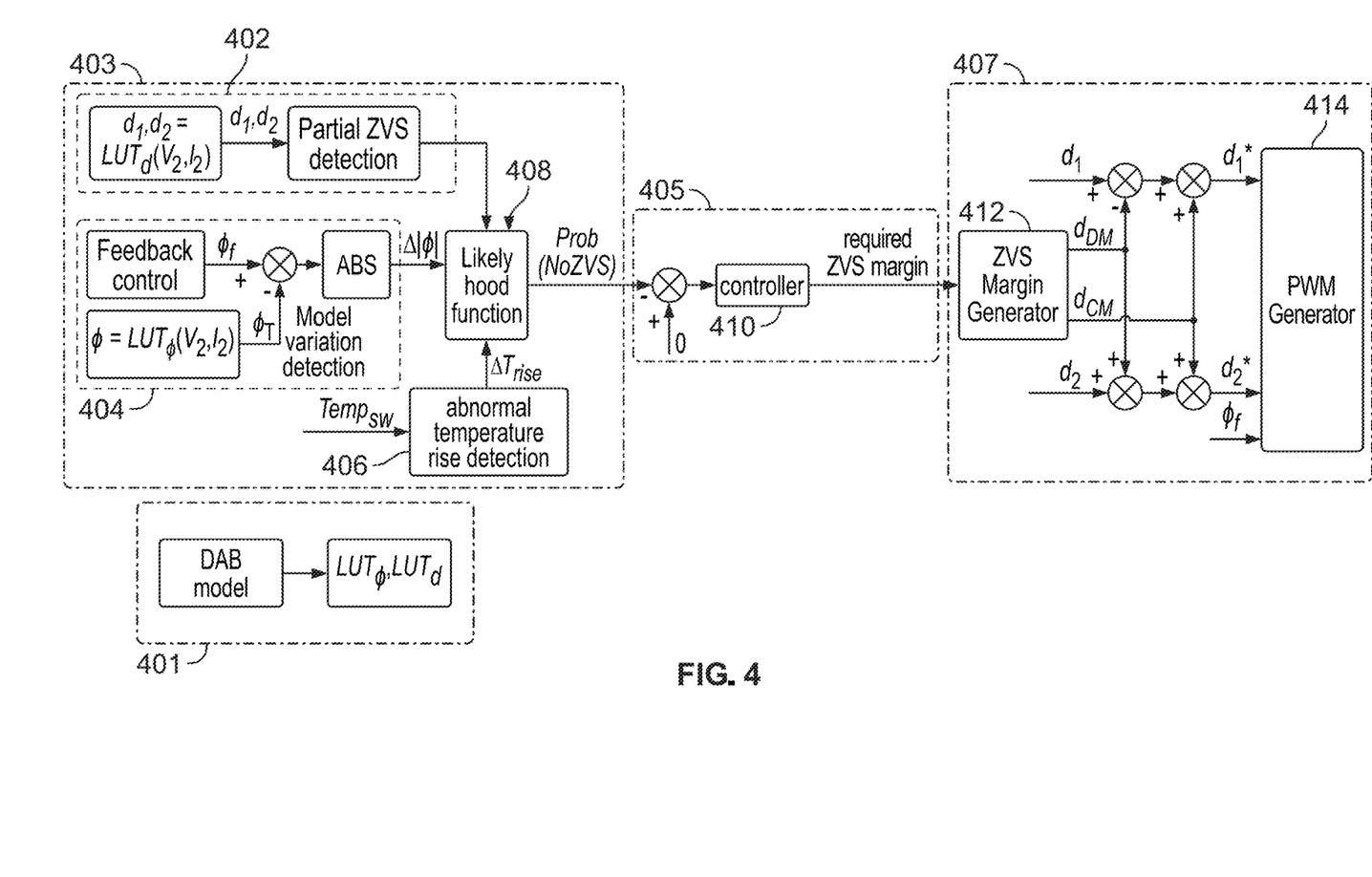
FIG. 4 is an illustrative block diagram of control circuitry and operations for implementing a control process for the DAB converter based on a measured temperature of the DAB converter, in accordance with some embodiments of the present disclosure.

In some embodiments, current sensor 225 is configured to sense primary current iL. Current sensor 225 outputs to control circuitry 112 a signal indicating the primary current (iL). A complete signal path from current sensor 225 to current input port 213 of control circuitry 112 is omitted from FIG. 2 for clarity. In some embodiments, current sensor 225 implements a current zero crossing detector (e.g., for detecting when primary current iL crosses zero. In some embodiments (e.g., as illustrated in FIG. 4), current sensor 225 or the current zero crossing detector may be omitted.

Control circuitry 112 includes storage interface port 208, first input port 210 ($V_{IN\ Probe}$), temperature input port 211, second input port 212 ($V_{OUT\ Probe}$), current input port 213, and multiple output ports 214. Control circuitry 112 is configured to transmit and receive instructions, settings, rules, and/or other types of data to and from storage 110 via storage interface port 208. Control circuitry 112 is configured to sense an input voltage ($V_{IN}$) of DAB converter 114 via first input port 210 ($V_{IN\ Probe}$). Control circuitry 112 is configured to sense an output voltage ($V_{OUT}$) of DAB converter 114 via second input port 212 ($V_{OUT\ Probe}$). Control circuitry 112 is configured to sense a temperature of one or more of switches S1-S8. Control circuitry 112 is configured to sense primary current iL via current input port 213. In some embodiments, current input port 213 is configured to sense a zero current crossing (e.g., when current sensor 225 implements a current zero crossing detector).

Output ports 214 include primary switching control ports $S1_{CTL}$, $S2_{CTL}$, $S3_{CTL}$, and $S4_{CTL}$, by which control circuitry 112 provides respective switch control signals to respective switching control ports $S1_{CTL}$, $S2_{CTL}$, $S3_{CTL}$, and $S4_{CTL}$ of primary side switches S1, S2, S3, and S4. Output ports 214 also include secondary switching control ports $S5_{CTL}$, $S6_{CTL}$, $S7_{CTL}$, and $S8_{CTL}$, by which control circuitry 112 provides respective switch control signals to respective switching control ports $S5_{CTL}$, $S6_{CTL}$, $S7_{CTL}$, and $S8_{CTL}$ of secondary side switches S5, S6, S7, and S8, respectively. Complete signal paths from switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 are omitted from FIG. 2 for clarity. Nonetheless, switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 are indeed coupled to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 via respective signal paths. As described in further detail below, in some aspects, control circuitry 112 is configured to cause switch control signals (e.g., switch control signals $S1_{CTL}$, $S2_{CTL}$, $S3_{CTL}$, $S4_{CTL}$ of primary side bridge 220, and/or switch control signals $S5_{CTL}$, $S6_{CTL}$, $S7_{CTL}$, and $S8_{CTL}$ of secondary side bridge 222) to switch according to a switching sequence that extends ZVS over a wide operation range, while reducing switching losses.

In some embodiments, types of switches and/or switch configurations that differ from those shown in FIG. 2 may be utilized (e.g., switches with source and drain terminals located in positions that are the opposite of those shown in FIG. 2, active-high switches that are enabled with a logic-high gate voltage, active-low switches that are enabled with a logic-low gate voltage, or the like). The particular switches and configurations and logic levels shown and described herein are provided as illustrative examples. The principles herein apply similarly to other types of switches and/or switch configurations. The switches relating to the examples described herein are active-high switches that are enabled (e.g., activated) with a logic-high gate voltage and are disabled (e.g., inactivated) with a logic-low gate voltage.

Although a power cabinet is illustrated and described, it should be understood that DAB converter 114 may be used for any power converter that requires isolation and have direct current (DC) as input, output, or middle stage, such as an on-board charger in an electric vehicle or for an energy storage system.

Figure 3:
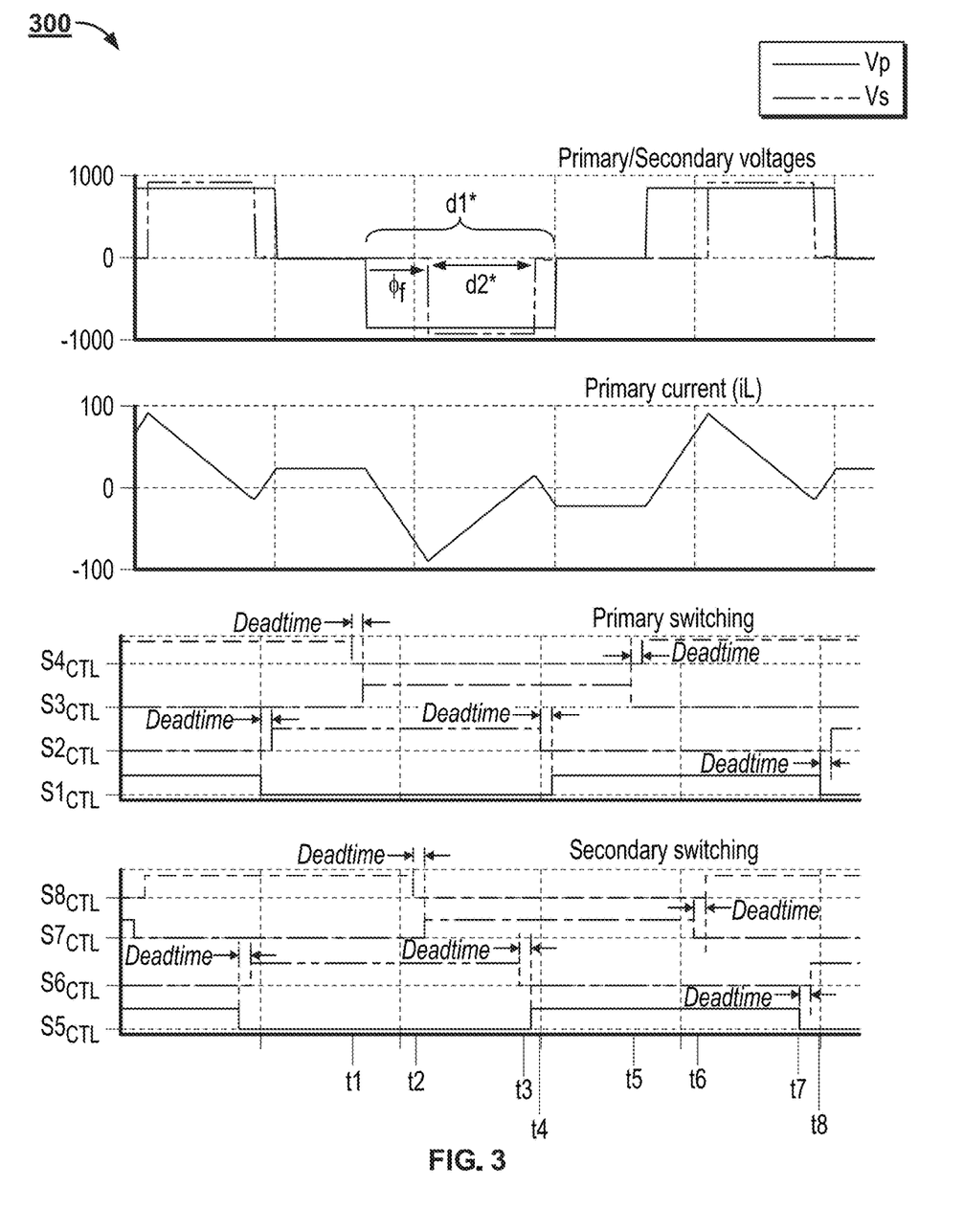
FIG. 3 depicts an illustrative timing diagram of a PWM switching pattern of switch control signals, and of the primary current ($i_L$), primary voltage (Vp), and secondary voltage (Vs) of the DAB converter, in accordance with some embodiments of the present disclosure.

FIG. 3 depicts an illustrative timing diagram 300 of a PWM switching pattern of switch control signals $S1_{CTL}$, $S2_{CTL}$, $S3_{CTL}$, $S4_{CTL}$, $S5_{CTL}$, $S6_{CTL}$, $S7_{CTL}$, and $S8_{CTL}$, and of primary current ($i_L$), primary voltage (Vp), and secondary voltage (Vs) of DAB converter 114, in accordance with some embodiments of the present disclosure. As shown, illustrative timing diagram 300 may correspond with controlling DAB converter 114 by a TPS modulation scheme and boost condition where Vs is greater than Vp. TPS modulation involves controlling the first duty ratio of primary side switches S1, S2, S3, and S4 (e.g., illustrated as modified first duty ratio $d_1^*$), the second duty ratio of secondary side switches S5, S6, S7, and S8 (e.g., illustrated as modified second duty ratio $d_1^*$), and phase shift $\phi_f$ between Vp and Vs, relative to the switching period (e.g., the outer phase shift angle). As understood, the first duty ratio corresponds to first inner phase shift angle of primary side bridge 220 (relative to the switching period), while second duty ratio corresponds to second inner phase shift angle of secondary side bridge 222 (relative to the switching period).

A PWM generator (e.g., PWM generator 414 of FIG. 4 or 6) may generate switch control signals $S1_{CTL}$-$S8_{CTL}$ based on modified control variables ($d_1^*$, $d_2^*$, and $\phi_f$), discussed below in further detail with respect to FIGS. 4 and 6. As shown, the modified control variables $d_1^*$, $d_2^*$, and $\phi_f$ control operation of DAB converter 114, such that: (1) at each rising edge of Vp (e.g., times t4 and t5), the primary current iL is negative; (2) at each falling edge of Vp (e.g., times t1 and t8), the primary current iL is positive; (3) at each rising edge of Vs (e.g., times t3 and t6), the primary current iL is positive; and (4) at each falling edge of Vs (e.g., times t2 and t7), the primary current iL is negative. As referred to herein, ZVS margin is the current value (e.g., primary current iL) at each voltage rising or falling edge. For example, at the rising edge of Vs at time t3, the ZVS margin is +10 A (i.e., the value of the primary current iL). This operation of DAB converter 114 extends ZVS for switches S1-S8 (while avoiding zero current switching (ZCS) and conduction losses from excess ZVS margin), as explained in greater detail below.

As shown in FIG. 3, at each time a switch is turned off, the primary current iL is in such a direction so as to cause the anti-parallel diode of the opposite switch (e.g., the complementary switch or interlocked switch) to conduct, even before the opposite switch receives a control signal to turn on (e.g., after the deadtime $D_{deadtime}$) elapses. When the anti-parallel diode of the complementary switch conducts, it causes the transformer voltage to change to the opposite polarity and the current (primary current iL) to start charging transformer 218. Thus, the voltage across the switch is clamped to zero, so that when the switch control signal for the switch is received, the switch sees zero voltage (e.g., ZVS). That is, the primary current iL discharges energy stored by the output capacitance of the switch, so that the stored energy is discharged into transformer 218 instead of the switch, thereby reducing switching loss of the switch. For example, at time t1, switch control signal $S4_{CTL}$ switches the logic level of switch S4 from high to low. Because a ZVS condition is provided, the anti-parallel diode of switch S3 conducts, and the primary voltage Vp switches to negative and primary current iL starts charging (decreasing), which discharges energy stored by the output capacitance of switch S3 into transformer 218 instead of switch S3 (as heat). When the anti-parallel diode of switch S3 conducts, the voltage across switch S2 is clamped to zero, so when switch control signal $S3_{CTL}$ switches the logic level of switch S3 from low to high, switch S3 sees zero voltage (e.g., a ZVS condition). In contrast, in conventional operation of DAB converters where ZVS is not provided, the anti-parallel diode of the complementary switch (e.g., switch S3) does not conduct when the switch (e.g., switch S4) receives the switch control signal (e.g., $S4_{CTL}$) to switch from high to low and switching losses are increased. As explained in greater detail below, by optimizing ZVS margin during operation (e.g., to extend ZVS without introducing conductions losses from excess ZVS margin), switching losses, temperature rise, electromagnetic interference (EMI), and failure rate may be reduced.

In some embodiments, $D_{deadtime}$ (e.g., the time between the switch control signals for complementary switches) is selected so that there is sufficient time for the energy stored by the output capacitance of the switch to discharge, without increasing conduction loss (e.g., by having excess time after the energy stored by the output capacitance is discharged). In some embodiments, $D_{deadtime}$ is 400 ns. It should be understood that FIG. 3 is not to scale and that the length of illustrated $D_{deadtime}$ is exaggerated for understanding.

The other complementary switches operate in a similar manner as switches S3 and S4 described above. For example, as shown, at each of times t2, t3, t4, t5, t6, t7, and t8, based on the modified control variables (d1*, d2*, and $\phi_f$), primary current iL is such that energy stored by the output capacitance of the complementary switches is discharged into transformer 218, before the complementary switches receive a switch control signal to turn on, thereby extending ZVS and reducing switching losses of DAB converter 114 by optimizing the ZVS margin.

FIG. 4 is an illustrative block diagram of control circuitry and operations for implementing a control process for DAB converter 114 based on a measured temperature of DAB converter 114, in accordance with some embodiments of the present disclosure. The control process may be implemented by control circuitry 112 of FIG. 1. For convenience of description, the control process is described as being performed by a plurality of modules implemented by control circuitry 112. For example, as shown, control circuitry 112 implements initial variables determination module 401, ZVS likelihood determination module 403, ZVS margin determination module 405, and adjusted control variables determination module 407.

As shown, initial variable determination module 401 determines the initial control variables (d1, d2, and $\phi_T$) for DAB converter 114. For example, initial variable determination module 401 may use a DAB model to calculate two look-up tables, LUT$\phi$ and LUT$_d$. In some embodiments, the look-up tables may be optimized for one or more parameters of DAB converter 114 (e.g., reduced transformer current RMS value), while maintaining ZVS under ideal conditions (e.g., without parameter variation). During operation, control circuitry 112 may retrieve, from LUT$\phi$, the phase shift $\phi_T$ between primary side bridge 220 and secondary side bridge 222, based on the detected output voltage ($V_O$) and a desired output current ($I_{out}$). Similarly, control circuitry 112 may retrieve, from LUT$_d$, a first duty ratio ($d_1$) of primary side bridge 220, a second duty ratio ($d_2$) of secondary side bridge 222, based on the detected output voltage ($V_O$) and the desired output current ($I_{out}$). In some embodiments, variable determination module 401 may use one or more look-up tables that were previously calculated and thus variable determination module 401 may not include a DAB model.

ZVS likelihood determination module 403 determines the probability of losing ZVS ($Prob_{no\_ZVS}$) based on a measured temperature of DAB converter 114. As shown, ZVS likelihood determination module 403 includes partial ZVS detection submodule 402, model variation detection submodule 404, abnormal temperature rise detection submodule 406, and ZVS likelihood determination submodule 408.

Partial ZVS detection submodule 402 detects whether DAB converter 114 operates under a partial ZVS condition. For example, in one embodiment, partial ZVS detection submodule 402 may assume that the DAB model used to calculate look-up tables LUTφ and LUT$_d$ is accurate and may determine (e.g., using predefined equations or calculations) whether the rising or falling edge of primary voltage Vp and secondary voltage Vs are overlapped, which may be a strong indicator of partial ZVS. For example, partial ZVS detection submodule 402 may use equation (1) to detect whether DAB converter 114 operates under a partial ZVS condition.

$$\cos\left(2\pi\left(\Phi_f + \frac{1}{2}(d_2 - d_1)\right)\right), \quad \text{Equation (1)}$$

where cos(x+0.5 pi) may be one example to calculate the reciprocal of equation (2) (e.g., without generating an infinite value).

$$\left|\Phi_f + \frac{1}{2}(d_2 - d_1)\right| \quad \text{Equation (2)}$$

In some embodiments, the real-time phase shift $\phi_f$ (e.g., generated by closed-loop control) may be used instead of the precalculated phase shift $\phi_T$ retrieved from look-up table LUTφ.

In another embodiment, first and second duty cycles $d_1$ and $d_2$ may be substituted with modified first and second duty cycles $d_1^*$ and $d_2^*$ (e.g., the real duty cycles input into PWM generator 414). However, this is only an example, and any suitable method of detecting a partial ZVS condition may be used. As shown, partial ZVS detection submodule 402 outputs a result of the determination to ZVS likelihood determination submodule 408.

Model variation detection submodule 404 detects a difference between the DAB model used to calculate look-up tables LUTφ and LUT$_d$ and the actual hardware of DAB converter 114. For example, model variation detection submodule 404 may determine the absolute value of the difference between precalculated phase shift $\phi_T$ retrieved from look-up table LUTφ and the real-time phase shift $\phi_f$. As shown, model variation detection submodule 404 outputs the determined difference (Δ|φ|) to ZVS likelihood determination submodule 408.

Figure 5:
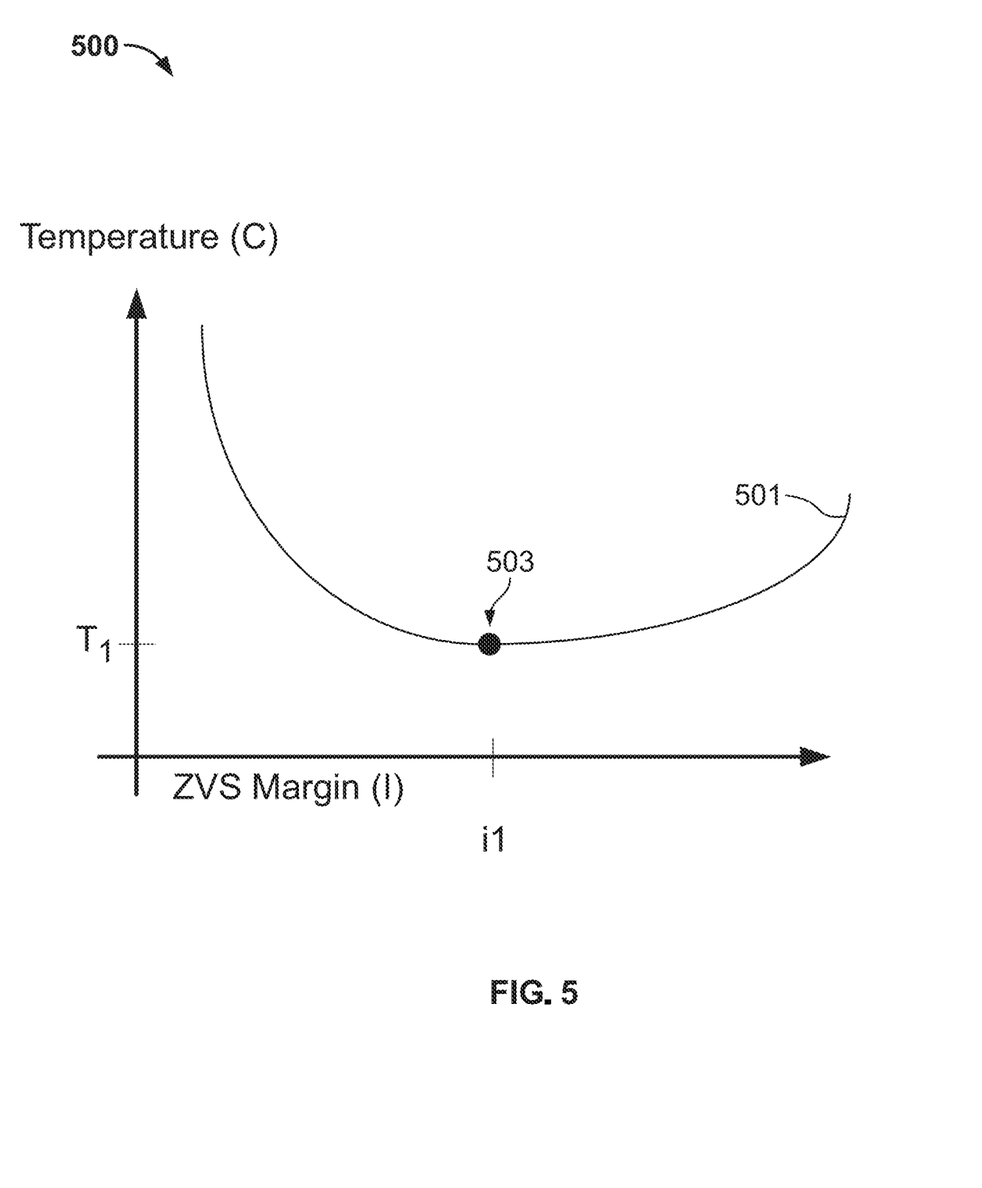
FIG. 5 is an illustrative waveform of the operating temperature of the DAB converter as a function of ZVS margin, in accordance with some embodiments of the present disclosure.

Abnormal temperature rise detection submodule 406 detects an abnormal temperature rise in DAB converter 114, based on one or more of signals $S_{TEMP}(1:8)$ indicating sensed temperatures of switches S1 through S8, respectively (e.g., Temp$_{sw}$). For example, the temperature rise (ΔT$_{rise}$) may be determined based on equation (3).

$$\Delta T_{rise} = \left|\frac{\delta(T_{pri} - T_{sec})}{\delta P_{out}}\right|, \quad \text{Equation (3)}$$

where $T_{pri}$ is the temperature of primary side bridge 220, $T_{sec}$ is the temperature of secondary side bridge 222, and $P_{out}$ is a power output of DAB converter 114. In some embodiments, $T_{pri}$ is determined by averaging the sensed temperatures of switches S1-S4, while $T_{sec}$ is determined by averaging the sensed temperatures of switches S5-S8. However, this is only one example, and the primary and secondary side temperatures $T_{pri}$ and $T_{sec}$ may be determined by any suitable manner (e.g., by using one temperature sensor per leg of DAB converter 114 or by using one temperature sensor per side of DAB converter 114). As explained in greater detail with reference to FIG. 5, an abnormal temperature rise ΔT$_{rise}$ may indicate either a loss of ZVS or excess ZVS margin, which may generate heat due to condition losses). As shown, abnormal temperature rise detection submodule 406 outputs the determined temperature rise ΔT$_{rise}$ to ZVS likelihood determination submodule 408.

ZVS likelihood determination submodule 408 implements a likelihood function to determine the probability of losing ZVS (Prob$_{no\_ZVS}$), based on the outputs of partial ZVS detection submodule 402, model variation detection submodule 404, and abnormal temperature rise detection submodule 406. In one embodiment, ZVS likelihood determination submodule 408 determines the probability of losing ZVS (Prob$_{no\_ZVS}$) as an average or weighted average of the outputs of partial ZVS detection submodule 402, model variation detection submodule 404, and abnormal temperature rise detection submodule 406. For example, the probability of losing ZVS (Prob$_{no\_ZVS}$) may be determined according to equation (4).

$$\text{Prob}_{no\_ZVS} = k_1 x_1 + k_2 x_2 + k_3 x_3, \quad \text{Equation (4):}$$

where $x_1$ is the output of partial ZVS detection submodule 402, $x_2$ is the output of model variation detection submodule 404, $x_3$ is the output of abnormal temperature rise detection submodule 406, and $k_1$, $k_2$, and $k_3$ are weighted averages based on properties of DAB converter 114.

In another embodiment, the probability of losing ZVS (Prob$_{no\_ZVS}$) may be determined based on the mean square or mean square root of the outputs ($x_1$, $x_2$, and $x_3$). For example, the probability of losing ZVS (Prob$_{no\_ZVS}$) may be determined according to equation (5) or equation (6).

$$\text{Prob}_{no\_ZVS} = (x_1 - x_2)^2 + (x_2 - x_3)^2 + (x_3 - x_1)^2 \quad \text{Equation (5):}$$

$$\text{Prob}_{no\_ZVS} = \sqrt{(x_1 - x_2)^2 + (x_2 - x_3)^2 + (x_3 - x_1)^2} \quad \text{Equation (6):}$$

In another embodiment, the probability of losing ZVS (Prob$_{no\_ZVS}$) may be determined based on the maximum or minimum values of the outputs ($x_1$, $x_2$, and $x_3$). In another embodiment, the probability of losing ZVS (Prob$_{no\_ZVS}$) may be determined based on whether two or more of the outputs ($x_1$, $x_2$, and $x_3$) are greater than threshold values determined based on properties of DAB converter 114. For example, if two or more of the outputs ($x_1$, $x_2$, and $x_3$) are greater than threshold values, any of the above implementations of the likelihood function may be used; otherwise, Prob$_{no\_ZVS}$ may be set to zero. In another embodiment, heuristics using domain-specific knowledge may be used to determine the probability of losing ZVS (Prob$_{no\_ZVS}$). For example, if an abnormal temperature rise ΔT$_{rise}$ is not detected, Prob$_{no\_ZVS}$ may be set to zero. It should be understood that the likelihood function is not limited to these examples and that any suitable method may be used to determine the probability of losing ZVS (Prob$_{no\_ZVS}$), based on one or more of the outputs of partial ZVS detection submodule 402, model variation detection submodule 404, and abnormal temperature rise detection submodule 406. For example, in some embodiments, the probability of losing ZVS (Prob$_{no\_ZVS}$) may be determined only on the output of abnormal temperature rise detection submodule 406 and ZVS detection submodule 402 and model variation detection submodule 404 may be omitted.

ZVS margin determination module 405 may determine (e.g., by controller 410) the required ZVS margin to achieve ZVS based on the determined probability of losing ZVS (Prob$_{no\_ZVS}$), which is received from ZVS likelihood determination module 403. As shown, ZVS margin determination module 405 outputs the required ZVS margin to adjusted control variables determination module 407.

As shown, adjusted control variables determination module 407 includes ZVS margin generator 412 and PWM generator 414. ZVS margin generator 412 may modify first and second duty ratios $d_1$ and $d_2$ by adjusting at least one of differential mode (DM) adjustment variable $d_{DM}$ and common mode (CM) adjustment variable $d_{CM}$ in order to achieve ZVS, based on the required ZVS margin received from ZVS margin determination module 405. In some embodiments, ZVS margin generator 412 may incrementally increase or decrease the ZVS margin. For example, ZVS margin generator 412 may limit the change in ZVS margin for each iteration of the control process until the desired ZVS margin is reached. As shown, modified first duty ratio $d_1^*=d_1-d_{DM}+d_{CM}$, while $d_2^*=d_2+d_{DM}+d_{CM}$. In some embodiments, phase shift $\phi_f$ may remain unchanged, thereby improving the efficiency of DAB converter 114, without changing the power output. Switch control signals $S1_{CTL}$-$S8_{CTL}$ for DAB converter 114 may be generated by PWM generator 414 based on the modified control variables ($d1^*$, $d2^*$, and $\phi_f$) and ZVS may be achieved across a wide range of operating conditions and parameter variation. Additionally, as explained in greater detail with reference to FIG. 5, by minimizing the operating temperature of DAB converter 114, ZVS margin may be optimized and conduction losses resulting from excess ZVS margin may be minimized.

FIG. 5 is an illustrative waveform 500 of the operating temperature of DAB converter 114 as a function of ZVS margin, in accordance with some embodiments of the present disclosure. As shown, an operating temperature $T_1$ of DAB converter 114 may be minimized when ZVS margin is optimized (e.g., when primary current iL is equal to $i_1$ at each voltage rising or falling edge for the current operating condition). The optimized (required) ZVS margin may be determined by the control process described above with reference to FIG. 4. For example, the control process may iteratively increase or decrease ZVS margin until the temperature of DAB converter 114 is minimized (e.g., $\Delta T_{rise}$ is minimized), based on the determined the probability of losing ZVS ($Prob_{no\_ZVS}$). For example, point 503 corresponds to a minimum operating temperature corresponding to a desired (e.g., optimized) ZVS margin along the plot 501 of operating temperature as a function of ZVS margin. As shown, loss of ZVS (e.g., caused by insufficient ZVS margin) and excess ZVS margin may increase the operating temperature of DAB converter 114.

FIG. 6 is an illustrative block diagram of control circuitry and operations for implementing a control process for DAB converter 114 based on a measured current of DAB converter 114, in accordance with some embodiments of the present disclosure. The control process may be implemented by control circuitry 112 of FIG. 1. For convenience of description, the control process is described as being performed by a plurality of modules implemented by control circuitry 112. For example, as shown, control circuitry 112 implements initial variables determination module 601, ZVS likelihood determination module 603, ZVS margin determination module 605, and adjusted control variables determination module 607. In some embodiments, the operation of initial variables determination module 601, ZVS margin determination module 605, and adjusted control variables determination module 607 may correspond to the operation of initial variables determination module 401, ZVS margin determination module 405, and adjusted control variables determination module 407, respectively, described above with respect to FIG. 4. Thus, for clarity, the operation of these modules is not described again here.

Similar to ZVS likelihood determination module 403 of FIG. 4, ZVS likelihood determination module 603 determines the probability of losing ZVS ($Prob_{no\_ZVS}$). However, instead of determining the probability of losing ZVS ($Prob_{no\_ZVS}$) based on the measured temperature of DAB converter 114, ZVS likelihood determination module 603 determines the probability of losing ZVS ($Prob_{no\_ZVS}$) based on the phase difference between a detected zero crossing of primary current iL (e.g., of transformer 218) and the transformer voltage rising and falling edges. For example, as shown, ZVS likelihood determination module 603 includes zero crossing detector submodule 602 and ZVS detection logic 604. Zero crossing detector submodule 602 detects, e.g., based on the current detected by current sensor 225, when primary current iL crosses zero from negative to positive (e.g., a "current positive crossing" $i_{cross+}$) and when primary current iL crosses zero from positive to negative (e.g., a "current negative crossing" $i_{cross-}$). Zero crossing detector submodule 602 may include any suitable hardware for detecting zero current crossings. For example, zero crossing detector submodule 602 may be implemented by current sensor 225, by control circuitry 112, or by a combination of current sensor 225 and control circuitry 112. In response to detecting a zero current crossing, zero crossing detector submodule 602 outputs a signal to ZVS detection logic 604. ZVS detection logic 604 determines a probability of losing ZVS ($Prob_{no\_ZVS}$), based on the signal from zero crossing detector submodule 602 and the rising and falling transformer voltages of transformer 218. For example, $Vp_{rise}$ and $Vp_{fall}$ define the rising edge and the falling edge of primary voltage Vp, while $Vs_{rise}$ and $Vs_{fall}$ define the rising edge and the falling edge of secondary voltage Vs. ZVS detection logic 604 may determine that ZVS conditions are met (and output $Prob_{no\_ZVS}=0$) when equation (7) or equation (8) is satisfied.

$$i_{cross+} \text{ is between } Vs_{rise} \text{ and } Vp_{rise}, \text{ when } Vs_{rise} \text{ is lagging } Vp_{rise}. \quad \text{Equation (7):}$$

$$i_{cross-} \text{ is between } Vs_{rise} \text{ and } Vp_{rise}, \text{ when } Vs_{rise} \text{ is leading } Vp_{rise}. \quad \text{Equation (8):}$$

Otherwise, if neither of equation (7) and equation (8) is satisfied, ZVS detection logic 604 outputs, to ZVS margin determination module 605, the distance between the zero current crossing and the midway points between $Vs_{rise}$ and $Vp_{rise}$ as the probability of losing ZVS ($Prob_{no\_ZVS}$). Based on the determined probability of losing ZVS ($Prob_{no\_ZVS}$), ZVS margin determination module 605 and adjusted control variables determination module 607 may determine the required ZVS margin (or change from the current ZVS margin) and generate switch control signals $S1_{CTL}$-$S8_{CTL}$ for DAB converter 114, as similarly described above with reference to FIG. 4. That is, based on the determined probability of losing ZVS ($Prob_{no\_ZVS}$).

Figure 7:
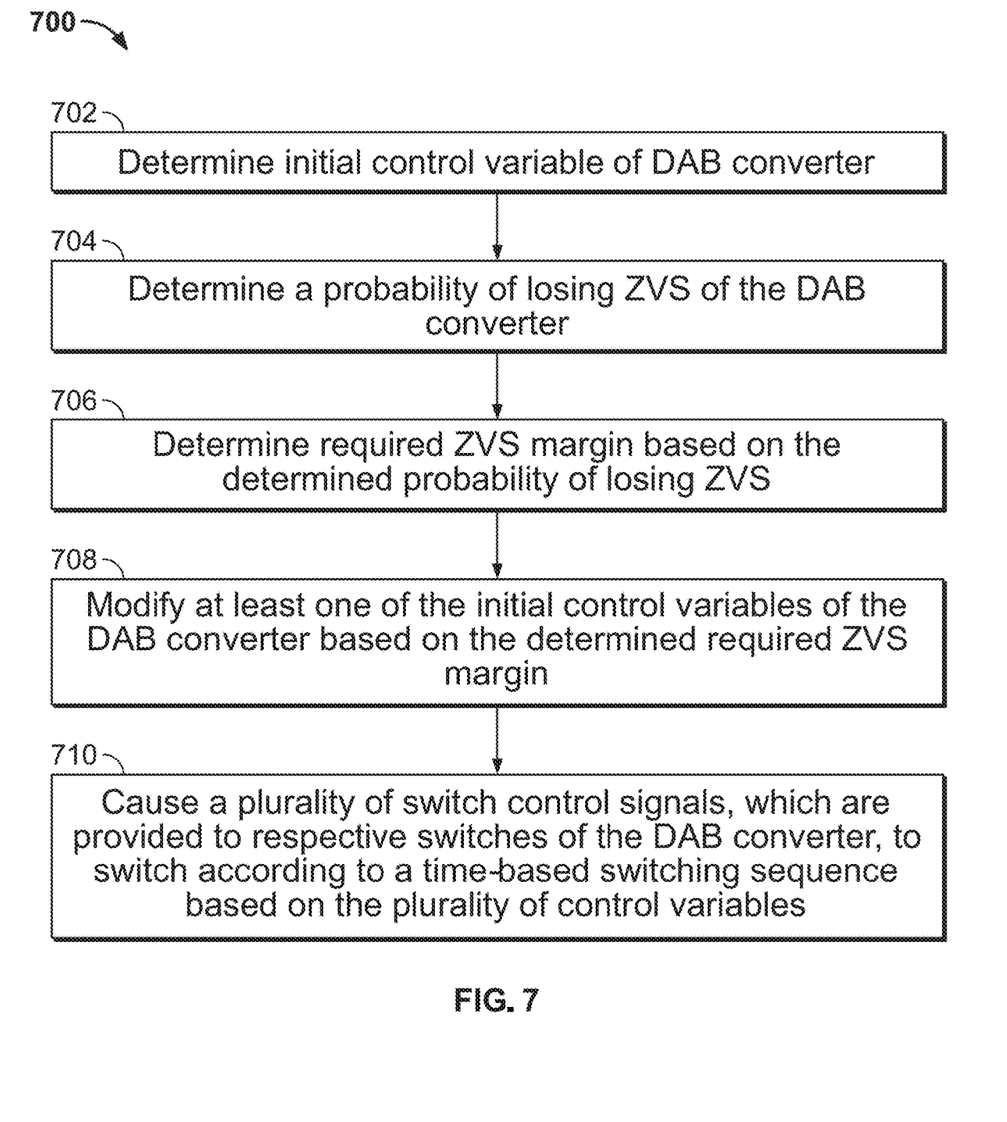
FIG. 7 depicts an illustrative flowchart of a control process of the DAB converter, in accordance with some embodiments of the present disclosure.

FIG. 7 depicts an illustrative flowchart 700 of a control process of DAB converter 114, in accordance with some embodiments of the present disclosure. In some embodiments, the control process may be the control process described above with reference to FIG. 4 or FIG. 6. At 702, control circuitry 112 determines initial control variables of DAB converter 114. For example, control circuitry 112 may retrieve from one or more look-up tables (e.g., stored in storage 110), a first duty ratio ($d_1$) of primary side bridge 220, a second duty ratio ($d_2$) of secondary side bridge 222, and a phase shift ($\phi_y$) between primary side bridge 220 and secondary side bridge 222, based on the detected output voltage ($V_O$) and a desired output current ($I_{out}$) of DAB converter 114. In some embodiments, control circuitry 112 may generate the one or more look-up tables in advance based on a DAB model (e.g., control circuitry 112 may implement initial variables determination module 401 of FIG. 4). In some embodiments, the one or more look-up tables are prestored (e.g., during the manufacturing or via a software update).

At 704, control circuitry 112 determines a probability of losing ZVS ($Prob_{no\_ZVS}$) (e.g., or a probability of ZVS). In one embodiment, control circuitry 112 determines the probability of losing ZVS ($Prob_{no\_ZVS}$) based on a measured temperature of DAB converter 114 (e.g., a detected temperature), as described above with reference to FIG. 4 (e.g., control circuitry 112 implements ZVS likelihood determination module 403 of FIG. 4, including partial ZVS detection submodule 402, model variation detection submodule 404, and abnormal temperature rise detection submodule 406). In another embodiment, control circuitry 112 determines the probability of losing ZVS ($Prob_{no\_ZVS}$) based on the phase difference between a detected zero crossing of primary current iL (e.g., of transformer 218) and the transformer voltage rising and falling edges, as described above with reference to FIG. 6 (e.g., control circuitry 112 implements ZVS likelihood determination module 403 of FIG. 6).

At 706, control circuitry 112 determines the required ZVS margin based on the determined probability of losing ZVS. For example, control circuitry 112 determines the optimum ZVS margin for operating DAB converter 114 in ZVS, while minimizing conduction losses caused by excess ZVS margin. In some embodiments, control circuitry 112 may determine an amount by which to adjust the current ZVS margin. In some embodiments, the amount by which the current ZVS margin can be adjusted is limited during each iteration of the control process (e.g., to limit the rate of change of the ZVS margin). Because the amount of ZVS margin is controlled and ZVS margin is only added when needed (e.g., based on the probability of losing ZVS), stability, robustness, and power efficiency of DAB converter 114 may be improved, while accounting parameter variation of DAB converter 114. In some embodiments, the current ZVS margin may be adjusted at the switching frequency of DAB converter 114 (e.g., 40,000 Hz). However, this is only one example, and the current ZVS margin may also be adjusted at a multiple of the switching frequency of DAB converter 114 (e.g., every n number of switches of DAB converter 114. In some embodiments, the interval at which the current ZVS margin is adjusted is based on the rate of change of the detected temperature (e.g., abnormal temperature rise $\Delta T_{rise}$).

At 708, control circuitry 112 modifies at least one of the initial control variables ($d_1$, $d_2$, and $\phi_T$) based on the determined required ZVS margin (or change of the current ZVS margin. For example, control circuitry 112 modifies at least one of the first duty ratio $d_1$ and the second duty ratio $d_2$ to achieve the desired ZVS margin by adjusting at least one of DM adjustment variable $d_{DM}$ and CM adjustment variable $d_{CM}$.

At 710, control circuitry 112 causes a plurality of switch control signals (e.g., switch control signals $S1_{CTL}$-$S8_{CTL}$), which are provided to respective switches S1-S8, to switch according to a time-based switching sequence based the real time phase shift ($\phi_f$) (e.g., generated by closed-loop control based on the predetermined phase shift $\phi_T$), and the modified first duty ratio $d_1^*$ and second duty ratio $d_2^*$. In some embodiments, the predetermined phase shift $\phi_T$ is not modified.

The processes discussed above are intended to be illustrative and not limiting. One skilled in the art would appreciate that the steps of the processes discussed herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method comprising:
    determining a probability of losing zero voltage switching (ZVS) of a dual active bridge (DAB) converter comprising a primary bridge, a secondary bridge, and a transformer coupling the primary bridge and the secondary bridge;
    modifying at least one control variable of a plurality of control variables of the DAB converter to change ZVS margin to achieve ZVS based on a determined probability of ZVS; and
    causing a plurality of switch control signals, which are provided to respective switches of the primary bridge and the secondary bridge, to switch according to a time-based switching sequence based on the plurality of control variables.

2. The method of claim 1, wherein determining the probability of losing ZVS comprises:
    measuring a temperature of the DAB converter; and
    determining the probability of losing ZVS based on the measured temperature.

3. The method of claim 2, wherein determining the probability of losing ZVS further comprises:
    determining whether the DAB converter is operating under partial ZVS;
    determining a difference between a predetermined phase shift between the primary bridge and the secondary bridge and a real-time phase shift between the primary bridge and the secondary bridge; and
    determining the probability of losing ZVS based on the determination of whether the DAB converter is operating under partial ZVS, the determination of the difference between the predetermined phase shift and the real-time phase shift, and the measured temperature.

4. The method of claim 2, wherein the probability of losing ZVS based on measured temperature corresponds to a determined temperature rise, where the determined temperature rise is:

$$\Delta T_{rise} = \left| \frac{\delta(T_{pri} - T_{sec})}{\delta P_{out}} \right|,$$

wherein $T_{pri}$ is a temperature of the primary bridge, $T_{sec}$ is a temperature of the secondary bridge, and $P_{out}$ is a power output of the DAB converter.

5. The method of claim 2, wherein modifying at least one control variable of the plurality of control variables of the DAB converter to change ZVS margin to achieve ZVS based on a determined probability of ZVS comprises iteratively modifying the at least one control variable until the measured temperature reaches a minimum temperature corresponding to a desired ZVS margin.

6. The method of claim 5, wherein the desired ZVS margin comprises a minimum current value of the transformer sufficient to enable an anti-parallel diode of each of the respective switches of the primary bridge and the secondary bridge to switch on and discharge charge stored on the respective switch.

7. The method of claim 5, wherein the minimum temperature corresponds to ZVS with an optimal ZVS margin.

8. The method of claim 5, wherein:
the plurality of control variables of the DAB converter comprises a first duty ratio of the primary bridge, a second duty ratio of the secondary bridge, and a phase shift between the primary bridge and the secondary bridge; and
modifying at least one control variable comprises modifying at least one of the first duty ratio and the second duty ratio.

9. The method of claim 8, wherein modifying at least one of the first duty ratio and the second duty ratio comprises adjusting at least one of a differential mode (DM) adjustment variable and a common mode (CM) adjustment variable.

10. The method of claim 1, wherein determining the probability of losing ZVS comprises:
measuring a current of the transformer; and
determining the probability of losing ZVS based on the measured current of the transformer.

11. A system for controlling a dual active bridge (DAB) converter having a primary bridge, a secondary bridge, and a transformer coupling the primary bridge to the secondary bridge, the system comprising:
a plurality of output ports coupled to switches of the DAB converter; and
control circuitry coupled to the plurality of output ports and configured to:
determine a probability of losing zero voltage switching (ZVS) of the DAB;
modify at least one control variable of a plurality of control variables of the DAB converter to change ZVS margin to achieve ZVS based on a determined probability of ZVS; and
cause a plurality of switch control signals, which are provided to respective switches of the primary bridge and the secondary bridge, to switch according to a time-based switching sequence based on the plurality of control variables.

12. The system of claim 11, further comprising a port of the DAB converter, wherein the control circuitry is coupled to the port and is configured to determine the probability of losing ZVS by:
measuring a temperature of the DAB converter; and
determining the probability of losing ZVS based on the measured temperature.

13. The system of claim 12, wherein the control circuitry is further configured to determine the probability of losing ZVS by:

determining whether the DAB converter is operating under partial ZVS;
determining a difference between a predetermined phase shift between the primary bridge and the secondary bridge and a real-time phase shift between the primary bridge and the secondary bridge; and
determining the probability of losing ZVS based on the determination of whether the DAB converter is operating under partial ZVS, the determination of the difference between the predetermined phase shift and the real-time phase shift, and the measured temperature.

14. The system of claim 12, wherein the probability of losing ZVS based on measured temperature corresponds to a determined temperature rise, where the determined temperature rise is:

$$\Delta T_{rise} = \left| \frac{\delta(T_{pri} - T_{sec})}{\delta P_{out}} \right|,$$

wherein $T_{pri}$ is a temperature of the primary bridge, $T_{sec}$ is a temperature of the secondary bridge, and $P_{out}$ is a power output of the DAB converter.

15. The system of claim 12, wherein the control circuitry is configured to modify at least one control variable of the plurality of control variables of the DAB converter to change ZVS margin to achieve ZVS by iteratively modifying the at least one control variable until the measured temperature reaches a minimum temperature corresponding to a desired ZVS margin.

16. The system of claim 15, wherein the desired ZVS margin comprises a minimum current value of the transformer sufficient to enable an anti-parallel diode of each of the respective switches of the primary bridge and the secondary bridge to switch on and discharge charge stored on the respective switch.

17. The system of claim 15, wherein the minimum temperature corresponds to ZVS with an optimal ZVS margin.

18. The system of claim 15, wherein:
the plurality of control variables of the DAB converter comprises a first duty ratio of the primary bridge, a second duty ratio of the secondary bridge, and a phase shift between the primary bridge and the secondary bridge; and
the control circuitry is configured to modify at least one control variable by modifying at least one of the first duty ratio and the second duty ratio.

19. The system of claim 18, wherein the control circuitry is configured to modify at least one of the first duty ratio and the second duty ratio by adjusting at least one of a differential mode (DM) adjustment variable and a common mode (CM) adjustment variable.

20. The system of claim 11, wherein the control circuitry is configured to determine the probability of losing ZVS by:
measuring a current of the transformer, and
determining the probability of losing ZVS based on the measured current of the transformer.

* * * * *